Jan. 18, 1955
G. M. THOMAS
2,699,971
DYNAMIC BRAKE INTERLOCK APPARATUS
Filed April 26, 1951
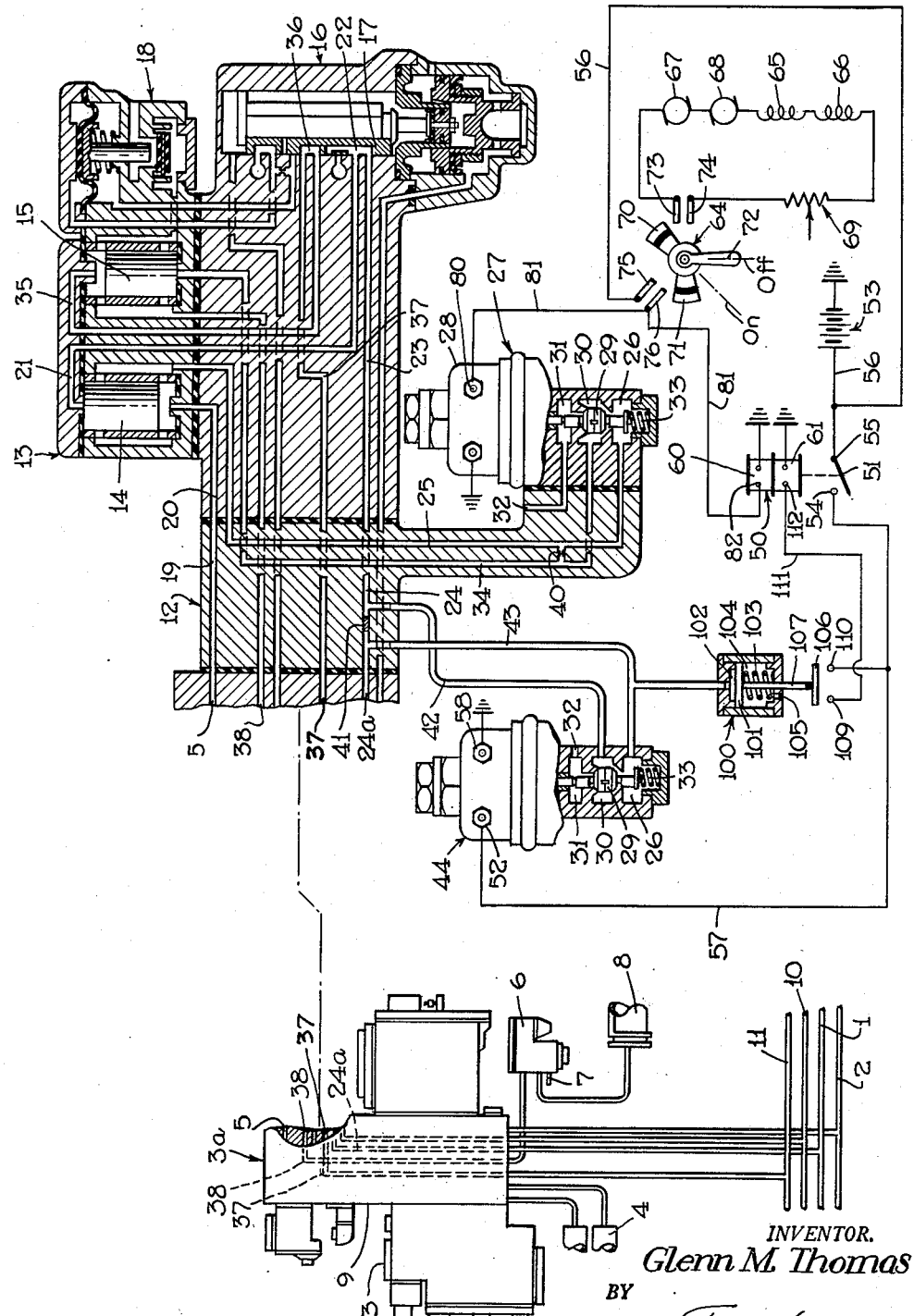
INVENTOR.
Glenn M. Thomas
BY
Frank E. Miller
ATTORNEY

2,699,971

DYNAMIC BRAKE INTERLOCK APPARATUS

Glenn M. Thomas, Dravosburg, Pa., assignor to Westinghouse Air Brake Company, a corporation of Pennsylvania Application April 26, 1951, Serial No. 223,087

3 Claims. (Cl. 303—3)

This invention relates to dynamic brake interlock apparatus and more particularly to the type for use on railway locomotives.

The No. 24RL locomotive brake equipment shown and described in Westinghouse Air Brake Company's Instruction Pamphlet No. 5066 dated March 1948 and as employed on modern diesel electric locomotives, is arranged to control the brakes on the locomotive and cars of a connected train on either the usual automatic principle through the medium of a brake pipe or the electropneumatic principle over train wires and through a straight air pipe, an automatic brake valve device being provided on the locomotive for selectively varying the pressure of fluid in the brake pipe and in a control pipe, the pressure in the latter pipe controlling a relay for controlling energization and deenergization of said train wires to provide a pressure in the straight air pipe corresponding to that in said control pipe. An independent brake valve device is also provided on the locomotive for controlling the brakes thereon independently of the brakes on the cars in the well-known manner.

When the automatic brake valve device is conditioned to control the brakes through the straight air pipe, its handle is movable to a release position for venting the straight air pipe to effect a release of brakes on the locomotive and cars of the train and is movable from said release position into an application and release zone for providing fluid in said straight air pipe at a pressure proportional to the extent of movement from said release position, or in accordance with the position in said zone, to provide a corresponding degree of application of brakes on the locomotive and cars of the train.

When conditioned to control the brakes on the locomotive and cars of the train on the automatic principle the brake valve handle is movable to a release position to charge the brake pipe with fluid under pressure to release the brakes, to a service position for reducing the pressure of fluid in the brake pipe to cause a service application of brakes, and to a lap position for limiting the degree of reduction in brake pipe pressure and thereby the degree of service application of brakes, it being understood that a brake controlling valve device on each unit of the locomotive and on each car of the train responds to the variations in brake pipe pressure to so control the brakes on the respective unit or cars.

On the locomotive the electric propelling motors are adapted to act as generators to produce dynamic braking of the locomotive and generally it is undesirable that the fluid pressure brakes be effective at the same time as the dynamic brakes, due particularly to the possibility of stalling the driver wheels on the locomotive and causing them to slide on the track rails and develop flat spots which are not only annoying during running of the locomotive but also expensive to remove. Therefore a magnet valve device has been provided to operate, when the dynamic brakes on the locomotive are cut into operation, to prevent an application of the fluid pressure brakes on the locomotive either from the straight air pipe or the brake pipe or to release such an application of fluid pressure brakes if in effect. When the dynamic brakes are cut out of operation, generally at a time when they become substantially ineffective due to slowing down of the train, the magnet valve device is operative to permit reapplication of the fluid pressure brakes.

If at the time the dynamic brakes are cut out of operation the straight air pipe is charged with fluid under pressure for applying the brakes on the cars of the train, the pressure of fluid in said pipe will promptly become effective to reapply the locomotive brakes, while in case the brakes on the cars are applied in response to a reduction in brake pipe pressure and the brake valve device is in lap position the same will occur, since under this latter condition fluid under pressure supplied by the brake controlling valve devices on the locomotive units in response to the reduction in brake pipe pressure will be present in what is known as a displacement volume on each unit and upon cutting out of the dynamic brakes the fluid from said reservoirs will become effective to apply the brakes on the respective units.

It is undesirable to have the fluid pressure brakes on the locomotive units automatically reapply upon cutting out of the dynamic brakes, particularly if the reapplication is of considerable magnitude and which will usually occur at a relatively low speed of the train, since the resulting increase in retardation of the locomotive and cars is liable to cause rough stopping of the train and discomfort to passengers.

The principal object of the invention is therefore the provision of improvements for use in the 24RL equipment which will avoid the above difficulty.

According to this object means are provided to prevent automatic reapplication of the fluid pressure brakes on the locomotive upon the dynamic brakes becoming ineffective and which requires, in case a reapplication of the fluid pressure brakes on the locomotive is desired, an operation of the brake valve device by the engineer. If it is desired that the brakes on the cars be applied in response to pressure of fluid in the straight air pipe; then, upon cutting out the dynamic brakes, it is necessary that the enginer move the brake valve device to release position and reduce the pressure in the straight air pipe down to some low degree, such as five pounds, before he can reapply the locomotive brakes by movement of said brake valve device into the application and release zone. On the other hand, if it is desired that the brakes on the cars of the train be applied in response to a reduction in brake pipe pressure it is necessary for the engineer to move the brake valve handle from lap to service position to reapply the locomotive brakes. In other words, to reapply the locomotive brakes under the condition in question requires positive operation of the brake valve device by the engineer.

Other objects and advantages will become apparent from the following more detailed description of the invention.

In the accompanying drawing, the single figure is a diagrammatic view of a portion of the No. 24RL locomotive brake equipment embodying the invention.

Description

The fluid pressure brake equipment with which the invention is adapted to be associated may be like that disclosed in the Instruction Pamphlet above referred to in view of which the disclosure in the application drawing and the following description thereof is limited to only such as essential to a clear understanding of the invention.

As shown in the drawing, the reference numerals 1 and 2 designate, respectively, an electro-pneumatic straight air control pipe and a brake pipe both of which are adapted to extend through a locomotive and cars of a train. An engineer's automatic brake valve device (not shown) is adapted to control pressure of fluid in both of the pipes 1 and 2 and when adjusted for controlling pressure of fluid in the pipe 1 is movable to a brake release position for opening the pipe 1 to atmosphere and is movable from said release position into an application and release zone for supplying fluid to said pipe at a pressure proportional to the extent of such movement. When the brake valve device is adjusted for controlling the pressure of fluid in the brake pipe 2, it is operative to a release position to charge said pipe with fluid under pressure, to a service position to effect any desired degree of service reduction in pressure in said pipe and to a lap position to bottle-up the fluid in the brake pipe at the desired reduced pressure.

Reference numeral 3 designates a service portion of a brake controlling valve device 3a, one of which will be provided on each unit of the locomotive, and which is adapted to operate in response to a serive reduction in pressure in the brake pipe 2 for supplying fluid under pressure from an auxiliary reservoir 4 to a passage 5 and thence through a communication, to be subsequently described, to a relay valve device 6 for effecting operation thereof to supply fluid at a like pressure from a supply pipe 7 to a brake cylinder device 8 for applying the brakes on the locomotive. When the pressure in the auxiliary reservoir 4 is thus reduced by flow to the relay valve device 6 to a degree slightly lower than in the brake pipe 2, the service portion 3 will move to lap position to terminate such flow and thereby limit the pressure of fluid obtained in the relay valve device 6 according to the reduction in pressure in the brake pipe 2. When the brake pipe 2 is recharged with fluid under pressure, the service portion 3 will respond thereto and move to open the passage 5 to atmosphere for releasing fluid under pressure from the relay valve device 6 to cause operation thereof to release fluid under pressure from the brake cylinder device 8 to release the locomotive brakes.

As will be seen from the drawing, the brake controlling valve device 3a comprises a bracket 9 upon one face of which is mounted the service portion 3 and to which is connected the auxiliary reservoir 4, the relay valve device 6, the straight air pipe 1, the brake pipe 2, a so-called actuating pipe 10 and an independent application and release pipe 11. Mounted on another face of the bracket 9 is a dynamic interlock device 12 and carried by said device is an independent application and release valve device 13.

The independent application and release valve device 13 comprises two double check valves 14, 15, a selector valve device 16 comprising a slide valve 17 having a normal position, in which it is shown in the drawing, providing for control of brakes on the locomotive from the straight air pipe 1, the brake pipe 2, or the independent application and release pipe 11. A quick release valve device 18 is also comprised in the independent application and release valve device 13, but its operation is not pertinent to an understanding of the invention. The independent application and release pipe 11 is adapted to be connected to an engineer's independent brake valve device (not shown) which is operative to supply fluid under pressure to and release fluid under pressure from said pipe for controlling application and release of locomotive brakes independently of the straight air pipe 1 and brake pipe 2, as will be later described.

The passage 5 in pipe bracket 9 is connected through a passage 19 in the dynamic interlock device 12 to a passage 20 open to one end of the double check valve 14, the opposite end of which is open to one end of a passage 21, which is connected through a cavity 22 in slide valve 17 in the normal position thereof to a passage 23 connected to a passage 24 in the dynamic brake interlock device 12 and adapted to be open, by means to be later described, when the dynamic brakes on the locomotive are ineffective, to a passage 24a in the pipe bracket constantly connected to the straight air pipe 1.

When, by operation of the service portion 3 of the brake controlling valve device 3a, fluid under pressure is supplied to passage 5 as above described, such fluid will flow to the lower end of check valve 14 and shift said check valve to an upper position, in which it is shown in the drawing, and then flow to a passage 25 in the dynamic brake interlock device 12. When fluid under pressure is supplied to the straight air pipe 1, such fluid will normally flow through passages 24a, 24, 23, cavity 22 in slide valve 17, and passage 21 to the upper end of the double check valve 14 and shift said check valve to a lower position and then flow to passage 25.

Passage 25 leads to a chamber 26 in a dynamic brake interlock magnet valve device 27 constituting a part of the dynamic interlock device 12. The magnet valve device 27 comprises a magnet 28 which is adapted to be energized when the dynamic brakes on the locomotive are effective to brake the locomotive and deenergized when said brakes are ineffective, as will be described hereinafter.

The magnet 28 is arranged to control a double seating valve 29 contained in a chamber 30. Upon energization of magnet 28 it is adapted to seat valve 29 in a direction to close communication between chamber 26 and chamber 30 and open the latter chamber to a chamber 31 which is constantly open to atmosphere through a passage 32. Upon deenergization of magnet 28 a spring 33 is adapted to seat valve 29 in the opposite direction for closing communication between chambers 30 and 31 and for opening chamber 30 to chamber 26. The chamber 30 is connected by a passage 34 extending through the dynamic interlock valve device 12 and the independent application and release valve device 13 to the lower end of the double check valve 15. The opposite end of the double check valve 15 is open to a passage 35 which is open through a cavity 36 in the selector slide valve 17, when in its normal position, to a passage 37 extending through the independent application and release valve device 13, the dynamic brake interlock valve device 12 and pipe bracket 9 of the brake controlling valve device 3a to constantly open connection with the independent application and release pipe 11.

With the structure so far described, it will be noted that when the dynamic brakes on the locomotive are ineffective and the magnet 28 consequently deenergized and the valve 29 seated in its upper position, if by operation of the service portion 3 of the brake controlling valve device 3a fluid under pressure is supplied to passage 5, such fluid will flow through passages 19, 20, past the lower end of double check valve 14 to passage 25, thence past the double seating magnet controlled valve 29 to passage 34 and from the latter passage past the lower end of double check valve 15 to a passage 38 connected to the relay valve device 6 whereby such fluid may operate said relay valve device for applying the locomotive brakes. On the other hand, if fluid under pressure is supplied to passage 24 in device 12 from the straight air pipe 1 as will be described hereinafter, it will flow through passage 23, cavity 22 in slide valve 17, passage 21, past the upper end of the double check valve 14 to passage 25 and thence through the communication just described to the relay valve device 6 for operating same to apply the locomotive brakes, the application occurring in both cases past the valve 29 with the magnet 28 deenergized which occurs when the dynamic brakes on the locomotive are ineffective.

If the dynamic brakes on the locomotive are effective and the magnet 28 is consequently energized and seating valve 29 in its lower position, fluid under pressure will be blocked against flow to passage 34 and said passage will be vented past said valve and through passage 32 to atmosphere. Consequently, if either an automatic or an electro-pneumatic straight air application of brakes is in effect at the time that the dynamic brakes are cut into operation such application of brakes will be released, or if such an application of brakes is not in effect at the time the dynamic brakes are cut into operation it will be prevented by the valve 29 seated in its lower position venting the passage 34.

When the dynamic brakes are cut out of operation, it is desired that an automatic application of the fluid pressure brakes be prevented by fluid under pressure which may be present in the straight air pipe 1 for applying the car brakes or by fluid under pressure which may be present in passage 25 from the service portion 3 which might be in either lap or service position as a result of reducing brake pipe pressure to apply the car brakes. In other words, if an application of the fluid pressure brakes on the locomotive is desired at the time the dynamic brakes are cut out, it is desirable that such be at the discretion of the engineer.

To this end, passage 25 is open to passage 34 through a leak or bleed choke or port 40, so that while the dynamic brakes are effective, if by operation of the service portion 3 of the brake controlling valve device 3a fluid under pressure should be present in passage 5 at the time that the dynamic brakes were cut into operation or were supplied to said passage while the dynamic brakes were effective, such fluid would leak away through said port to passage 34 and thence to atmosphere past the magnet valve 29 which would be seated in its lower position. With passage 5 thus vented when the dynamic brakes are effective no application of the fluid pressure brakes on the locomotive will occur upon cutting out of the dynamic brakes unless the engineer desires such and intentionally operates the automatic brake valve device to reduce the pressure in the brake pipe to cause operation of the service portion 3 to supply fluid under pressure to passage 5 to obtain an application.

According to the invention, communication through passage 24 in the dynamic brake interlock device 12 may be closed by such as a plug 41 to cause fluid under pressure supplied to passage 24a in device 3a to flow via a connected pipe 43 to a magnet valve device 44 which controls communication between the pipe 43, hence passage 24a, and a pipe 42 connected to passage 24.

The magnet valve device 44 may be substantially similar to the magnet valve device 27 previously described. For sake of brevity, description of the magnet valve device 27 will be relied upon for description of device 44, and the identical parts bear like reference numerals in the drawing.

In the magnet valve device 44, its chamber 31 is connected to atmosphere via a port 32, its chamber 30 is connected to the pipe 42, and its chamber 26 is connected to the pipe 43.

According to the invention, a two-coil relay 50 is provided for controlling energization and deenergization of the magnet valve device 44. Relay 50 comprises the usual switch 51 having an open position in which it is shown in the drawing to interrupt electrical connection between one terminal 52 of the magnet valve device 44 and the positive terminal of such as a battery 53 which acts as a source of electrical energy. The usual contacts 54 and 55 are provided, arranged to be connected electrically in a closed position of the switch 51, contact 55 being connected to the positive terminal of the battery 53 via such as a wire 56, and the contact 54 being connected to terminal 52 of device 44 via such as a wire 57. The other terminal, a terminal 58, of the magnet valve device 44, and the negative terminal of the battery 53 are both connected to ground as indicated in the drawing. Actuation of the switch 51 to its closed position is effected by energization of either of two coils 60, 61 of the relay.

Energization of coil 60 is controlled by an operator's controller device 64 which also controls energization of the magnet valve device 27 and application and release of dynamic braking.

For sake of illustration, schematically, the dynamic brakes may comprise a pair of traction motor fields 65, 66 and their respective armatures 67, 68 which are adapted by virtue of the controller device 64 to be connected as generators in a circuit which includes the usual variable rheostat 69 for varying the degree of resistance in the circuit through the traction motor fields to control their excitation under various rotational speeds of the wheel-driven armatures to control the current output of the traction motors acting as generators and thereby control the degree of dynamic braking at such speeds in the well-known manner.

Schematically, for sake of illustration, the controller device 64 simply may comprise two contact elements 70, 71 which are adapted to be moved by a handle 72 simultaneously into and out of engagement with two pairs of contacts, 73, 74 and 75, 76 for controlling energization and deenergization of magnet valve device 27 and relay coil 60 simultaneously with application and release of dynamic braking.

The contacts 73, 74 for engagement by contact element 70 of controller device 64 are connected to input and output of the dynamic braking circuit aforedescribed, and when controller contact element 70 is moved into and out of bridging engagement with contacts 73, 74, the dynamic braking circuit is completed and interrupted electrically, respectively.

One of the other pair of contacts, contact 75 for example, is connected to the positive terminal of the battery 53 via such as a branch of the wire 56, while the other contact 76 is connected to one terminal 80 of the magnet valve device 27 via such as a wire 81 and also to one terminal 82 of the relay coil 60 via such as a branch of the same wire 81. The opposite terminal of the magnet valve device 27 and of relay coil 60 may be grounded as indicated in the drawing for return to the negative pole of battery 53 when coil and magnet valve device are supplied with electrical energy.

Contact element 71 will move into and out of engagement with contacts 75, 76 at the same time element 70 makes and breaks the dynamic braking circuit, respectively, to connect and disconnect the magnet valve device 27 and relay coil 60 to and from the battery 53 for energizing and deenergizing same, respectively. The operation of the magnet valve device 27 in response to energization and deenergization of its magnet portion 28 is as aforedescribed.

According to the invention, with dynamic braking in effect and the relay coil 60 consequently energized, energization of magnet valve device 44 with consequent shifting of its valve 29 disestablishes communication between its chambers 26 and 30 hence between passages 24a and 24 in devices 3a and 12, respectively, and prevents fluid under pressure, which may be present in the straight air pipe 1 for effecting application of brakes on the train, from leaking to atmosphere by way of the passage 24, cavity 22 in slide valve 17, passage 21, double check valve 14, passage 25, choke 40, passage 34, chambers 30, 31 and passage 32 in magnet valve device 27, also energized with the dynamic brake on the locomotive cut in.

In order to prevent the fluid pressure brakes on the locomotive units from applying automatically upon cutting out of the dynamic brakes, a pressure switch 100 is provided which is cooperative to maintain the magnet valve device 44 energized to prevent communication between the locomotive brake relay valve device 6 and the straight air pipe 1 when the straight air pipe is pressurized at time of cut off of dynamic braking.

The pressure switch 100, for sake of illustration, schematically may comprise a piston 101 reciprocably disposed within a casing and subject opposingly to pressure of fluid in a pressure chamber 102 at one side and to force of a compression bias spring 103 disposed in a chamber 104 at its opposite side; chamber 102 being connected to the straight air pipe 1 via such as a branch of the pipe 43 and the passage 24a, and chamber 104 being constantly open at atmosphere by way of a port 105.

A switch element 106 disposed outside the casing is attached for reciprocable movement with piston 101 by means of such as the usual piston rod 107 which projects outwardly of the casing. Two fixed electrical contacts 109, 110 are disposed in the path of travel of switch element 106; contact 110 being connected to a branch of the wire 57, and contact 109 being connected to one terminal 112 of the relay coil 61 via a wire 111, the opposite terminal of which coil may be grounded for return to the negative terminal of the battery 53 when energizing the coil.

In operation, the pressure switch 100 will respond to pressurization of its chamber 102 by fluid under pressure from the straight air pipe 1 via passage 24a and pipe 43 to move switch element 106 to a closed position opposite to that in which it is shown in the drawing to electrically connect fixed contacts 109 and 110, hence wires 57 and 111, one with the other.

If the controller 64 is in its position for establishing dynamic braking at the time that switch element 106 assumes its closed position, the relay coil 61 will become energized along with coil 60 by way of the closed switch 51, wire 57, contact 110, switch element 106, contact 109, and the wire 111, so that when the controller 64 is operated to cut off dynamic braking on the locomotive and the relay coil 60 and magnet valve device 27 become deenergized as a result of such controller operation, the relay coil 61 will remain energized via the pressure switch element 106 to hold the relay switch 51 closed to maintain the magnet valve device 44 energized via wire 57 to prevent fluid under pressure from the straight air pipe 1 from reaching the locomotive brake relay 6 thereby to prevent the fluid pressure brakes on the locomotive from applying in response to pressure of fluid in the straight air pipe automatically upon cut out of dynamic braking.

To effect a straight air application of the fluid pressure brakes on the locomotive subsequent to a cut off of dynamic braking when the pressure switch element 106 is closed, it first becomes necessary for the operator to effect a reduction in pressure in straight air pipe 1, hence chamber 102 in pressure switch 100, down to some low value, such as five pounds, to allow for opening of switch element 106 by action of spring 103 with consequent deenergization of relay coil 61, opening of switch 51 and deenergization of magnet valve device 44 to establish communication between the straight air pipe 1 and the locomotive relay valve device 6. The operator may then effect straight air application of the fluid pressure brakes on the locomotive by pressurization of the straight air pipe 1 with consequent flow of fluid under pressure to the locomotive brake relay valve device 6 by way of passage 24a in device 3a, pipe 43, past valve 29 in the deenergized magnet valve device 44, the pipe 42, passage 24, cavity 22 in slide valve 17, passage 21, double check valve 14, passage 25, the valve 29 in deenergized lockout relay valve device 27, passage 34, double check valve 15, and passage and pipe 38.

It will be appreciated that pressurization of pipe 43 by flow of fluid under pressure from the straight air pipe 1 as above described, will be reflected in pressure chamber 102 in pressure switch device 100 which will respond to move switch element 106 to its closed position, but without effect on the magnet valve device 44 at this time because of the open switch 51 controlling supply of electrical energy to the pressure switch device 100.

Subsequent cutting in of dynamic braking on the locomotive by operation of controller 64 will again simultaneously effect energization of the lockout magnet valve device 27 and relay coil 60. Energization of the lockout magnet valve device 27 will prevent fluid under pressure which may be supplied to passage 5 as a result of a reduction in pressure in the brake pipe 2 from reaching the locomotive brake relay valve device 6 by disestablishing communication between passages 25 and 34 via chamber 36 closed by valve 29 to chamber 30 and will allow any fluid under pressure supplied to passage 25 from passage 5 to leak off to atmosphere via choke 40, passage 34 and chamber 30, valve 28, chamber 31 and passage 32 in the lockout magnet valve device 27, so that fluid under pressure will not be present in passage 5 at time of dynamic brake cut off to cause an automatic application of fluid pressure brakes on the locomotive. At the same time, as aforedescribed, energization of relay coil 60 will close the switch 51 to energize magnet valve device 44 and thereby prevent any fluid under pressure supplied to the straight air pipe 1 from leaking off to atmosphere by way of the choke 40.

*Summary*

It will be seen now that novel apparatus has been provided for use with the 24RL locomotive brake equipment to release fluid pressure brakes on the locomotive automatically upon cutting the dynamic brakes on the locomotive into operation and to prevent such fluid pressure brakes from applying automatically upon cutting such dynamic brakes out of operation. To apply the fluid pressure brakes on the locomotive subsequent to cut off of the dynamic brakes requires a conscious effort on the part of the operator.

Having now described my invention, what I claim as new and desire to secure by Letters Patent, is:

1. In combination, fluid pressure operated brake means, a first communication connected to said brake means, a second communication, first magnet valve means operative upon deenergization to establish a first fluid pressure connection between said first communication and said second communication and operative upon energization to disestablish said first fluid pressure connection and to vent said first communication to atmosphere, choke means constantly connecting said first communication to said second communication, double check valve means having an outlet connected to said second communication and also having two inlets, a first fluid pressure brake control communication connected to one of said inlets and adapted to receive a certain volume of fluid under pressure, a second fluid pressure brake control communication connected to the other of said inlets, a third fluid pressure brake control communication adapted to receive fluid under pressure from a maintaining source, a second magnet valve device operative upon deenergization to establish a second fluid pressure connection between said second fluid pressure brake control communication and said third fluid pressure brake control communication and operative upon energization to disestablish said second fluid pressure connection and to vent said second fluid pressure brake control communication to atmosphere, a source of electrical energy, first switch means operable to open and closed positions to disconnect and connect, respectively, said second magnet valve means to said source of electrical energy, relay means energizable and deenergizable to operate said first switch means to its closed and open positions, respectively, pressure switch means responsive to pressurization and de-pressurization of said third fluid pressure brake control communication to establish and disestablish, respectively, electrical connection between said relay means and said first switch means, electro-dynamic brake means, and means operable to effect energization and deenergization of said first magnet valve means and of said relay means simultaneously with cut-in and cut-out, respectively, of said electro-dynamic brake means.

2. In fluid pressure brake apparatus, in combination, a straight air pipe, fluid pressure operable brake applying means responsive to supply of fluid under pressure to effect an application of brakes and responsive to release of fluid under pressure to effect a release of such brakes, magnet valve means energizable and deenergizable to connect said fluid pressure operable brake applying means selectively to atmosphere and to said straight air pipe, respectively, a source, of electrical energy, first switch means operable to closed and open positions to connect and disconnect, respectively, said magnet valve means electrically to and from said source of electrical energy, relay coil means energizable and deenergizable to operate said first switch means to its closed and open positions, respectively, pressure switch means responsive to pressurization and de-pressurization of said straight air pipe to establish and disestablish, respectively, electrical connection between said relay coil means and the output of said first switch means, electro-dynamic brake means, and means operable to effect energization and deenergization of said relay coil means coincidentally with cut-in and cut-out, respectively, of said dynamic brake means.

3. In fluid pressure brake control apparatus, in combination, a straight air pipe, fluid pressure operable brake applying means responsive to supply of fluid under pressure to effect an application of brakes and responsive to release of fluid under pressure to effect a release of such brakes, magnet valve means energizable and deenergizable to effectively connect said fluid pressure operable brake applying means selectively to atmosphere and to said straight air pipe, respectively, a source of electrical energy, first switch means having an electrical input connection with said source of electrical energy and an electrical output connection with said magnet valve means and operable to open and closed positions to make and break, respectively, electrical connection between said input connection and said output connection, two relay coils each energizable and deenergizable to operate said first switch means to its closed and open positions, respectively, pressure switch means responsive to pressurization and de-pressurization of said straight air pipe to establish and disestablish, respectively, electrical connection between said output connection and one of said two relay coils, an electro-dynamic brake circuit adapted to be closed and opened for establishing and disestablishing, respectively, dynamic braking, and means operable to connect and disconnect the other of said two relay coils electrically to and from said source of electrical energy coincidentally with closing and opening, respectively, said dynamic braking circuit.

References Cited in the file of this patent

UNITED STATES PATENTS

| | | |
|---|---|---|
| 1,400,840 | Turner | Dec. 20, 1921 |
| 1,710,762 | Aspinwall | Apr. 30, 1929 |
| 2,112,424 | McCune | Mar. 29, 1938 |